(12) United States Patent
Staev (10) Patent No.: US 8,136,789 B2
(45) Date of Patent: Mar. 20, 2012

(54) DRAIN VALVE ACTUATORS AND METHODS OF CONTROLLING DRAIN VALVES

(75) Inventor: Stoyan S. Staev, Lombard, IL (US)

(73) Assignee: Molon Motor and Coil Corporation, Arlington Heights, IL (US)

( * ) Notice: Subject to any disclaimer, the term of this patent is extended or adjusted under 35 U.S.C. 154(b) by 635 days.

(21) Appl. No.: 11/980,324

(22) Filed: Oct. 30, 2007

(65) Prior Publication Data
US 2009/0108220 A1 Apr. 30, 2009

(51) Int. Cl.
*F16K 31/02* (2006.01)
(52) U.S. Cl. ......... 251/129.12; 251/129.13; 251/249.5; 318/282; 318/286; 318/468
(58) Field of Classification Search ............ 251/129.01, 251/129.11–129.13, 249.5; 74/625; 475/3, 475/4, 7
See application file for complete search history.

(56) References Cited

U.S. PATENT DOCUMENTS

| | | | |
|---|---|---|---|
| 4,754,949 A * | 7/1988 | Fukamachi | 251/129.03 |
| 5,052,424 A * | 10/1991 | Zerndt et al. | 137/1 |
| 5,461,290 A * | 10/1995 | Tice | 318/266 |
| 6,078,160 A * | 6/2000 | Cilluffo | 318/641 |
| 6,186,471 B1 | 2/2001 | Genga et al. | |
| 6,250,323 B1 | 6/2001 | Genga et al. | |
| 6,290,207 B1 | 9/2001 | Genga et al. | |
| 6,371,440 B1 | 4/2002 | Genga et al. | |

* cited by examiner

*Primary Examiner* — John Fristoe, Jr.
*Assistant Examiner* — Marina Tietjen
(74) *Attorney, Agent, or Firm* — Bishop & Diehl, Ltd.

(57) ABSTRACT

A valve actuator operates a valve, such as a drain valve of an industrial washing machine. The valve actuator has a permanent magnet DC motor which drives a gear train which rotatably drives an output shaft. The output shaft is engaged with the drain valve and moves the drain valve to open and closed positions as desired. The valve actuator also has a controller which controls operation of the valve actuator. The controller provides power to the motor only when needed to open and close the drain valve. The controller does not provide power to the motor when the drain valve is in the open and closed positions.

4 Claims, 8 Drawing Sheets

DRAIN VALVE ACTUATORS AND METHODS OF CONTROLLING DRAIN VALVES

BACKGROUND OF THE INVENTION

This invention relates to valve actuators and methods of controlling valves. Embodiments of the present invention pertain to valve actuators for fluid drain valves used in industrial washing machines and other applications with high volume drain flow. Embodiments of the present invention also pertain to methods of controlling high volume drain valves, such as drain valves for industrial washing machines. Although embodiments of the present invention are described as drain valve actuators and related methods, the present invention is not limited to drain valve applications and can be practiced in embodiments applied to valves other than drain valves.

An existing industrial washing machine drain valve actuator has a motor which closes the drain valve against a force of a coil spring which is attached to the output shaft of the motor. The coil spring applies a force to the drain valve in the drain valve open direction. The motor is an AC shaded pole geared motor which closes the drain valve against the coil spring when AC voltage is applied to the motor winding. The AC power is provided to the motor as long as the valve must remain in the closed position. When the AC power is removed from the motor the coil spring forces the drain valve into the open position. A portion of the torque that the geared motor develops is used to place the coil spring in tension. The rest of the torque is used to move the drain valve to the closed position and to maintain the valve in the closed position. The locked rotor torque of the geared motor is enough to overcome the coil spring tension and to keep the valve sealed closed. When the AC voltage is removed from the motor terminals the coil spring recoils and the mechanical energy stored in the spring transfers to a rotary motion which opens the valve.

Existing drain valves can be improved. For example, the drain valve has hard mechanical stops at both end points of the closed position and the opened position. In other words, the coil spring forces the drain valve open until the moving valve hits a hard mechanical stop and cannot be moved any further. Similarly, the motor forces the drain valve closed until the moving valve hits a hard mechanical stop and cannot be moved any further.

Another problem with existing drain valve actuators is that the shaded pole geared motor stays on continuously during the time the valve is closed. The motor continuously consumes electrical energy which is needed to overcome the tension of the spring and to keep the valve closed.

Examples of drain valve actuators can be found in U.S. Pat. No. 6,186,471, U.S. Pat. No. 6,250,323, U.S. Pat. No. 6,290,207 and U.S. Pat. No. 6,371,440. The present invention has improvements over such drain valve actuators.

Accordingly, needs exist to improve valve actuators and related methods, such as drain valve actuators and related methods, for the reasons mentioned above and for other reasons.

SUMMARY OF THE INVENTION

The present invention provides new valve actuators and related methods. Embodiments of the new valve actuators and related methods can be applied to drain valves of industrial washing machines or other high volume fluid flow drain valves. In an embodiment, the valve actuator has a permanent magnet DC (PMDC) motor which drives a gear train which rotatably drives an output shaft. The output shaft is engaged with the drain valve and moves the drain valve to open and closed positions as desired. The valve actuator also has a controller which controls operation of the valve actuator. The controller provides power to the motor only when needed to open and close the drain valve. The controller does not provide power to the motor when the drain valve is in the open and closed positions. The valve actuator protects the motor from unnecessary electrical power when the valve is not being moved.

In an embodiment of the present invention, a valve actuator has a housing and an electric motor mounted to the housing in which the motor has a motor shaft. A rotatable output shaft extends through a wall of the housing. A gear train is positioned within the housing and is operatively connected to the motor shaft and to the output shaft. A controller is electrically connected to the motor. The controller has an output signal which drives the motor which drives the gear train which rotates the output shaft from a first position to a second position. The controller also has a signal reducer which reduces the output signal to the motor when the output shaft is in the second position.

The controller may also have a reverse output signal having a reverse polarity which reversely drives the motor which reversely drives the gear train which reversely rotates the output shaft from the second position to the first position.

The signal reducer of the valve actuator may reduce a voltage of the output signal to about 0 volts. The signal reducer may reduce a current of the output signal.

The signal reducer may be a timer. The signal reducer may be a switch and the gear train may have a cam which operatively contacts the switch. The signal reducer may be a positive temperature coefficient thermostat.

The controller may have a printed circuit board mounted to the motor.

The gear train may have a worm mounted on the motor shaft, a first cluster gear having first teeth engaged with the worm, a second cluster gear having first teeth engaged with second teeth of the first cluster gear, and an output gear engaged with second teeth of the second cluster gear. The output gear is engaged with the output shaft such that rotation of the output gear rotates the output shaft.

In an embodiment, a method of controlling a valve with a gear box includes providing electrical power to a DC motor of the gear box, driving a gear train in the gear box with the DC motor, rotating a gear box output shaft by the driven gear train, moving the valve from a first position to a second position by the rotation of the gear box output shaft, and reducing the power to the DC motor when the valve is in the second position.

The method of controlling a valve with a gear box may also include subsequent to reducing the power to the DC motor, providing electrical power having reverse polarity to the DC motor, driving the gear train in reverse with the DC motor, rotating a gear box output shaft in reverse by the reversely driven gear train, moving the valve from the second position to the first position by rotation of the actuator output shaft, and reducing the power having reverse polarity to the DC motor when the valve is in the first position.

Reducing the power to the DC motor when the valve is in the second position may include reducing current by a positive temperature coefficient thermostat.

Reducing the power to the DC motor when the valve is in the second position may include actuating an electrical switch with a cam of the gear train.

Reducing the power to the DC motor when the valve is in the second position may include reducing the power when a time period of a timer ends.

Moving the valve from a first position to a second position by the rotation of the gear box output shaft may include moving a fluid drain valve from an open position to a closed position. Moving the valve from the second position to the first position by rotation of the actuator output shaft may include moving the fluid drain valve from the closed position to the open position.

Embodiments of the present invention may have various features and provide various advantages. Any of the features and advantages of the present invention may be desired, but, are not necessarily required to practice the present invention.

DETAILED DESCRIPTION OF THE INVENTION

Figure 1:
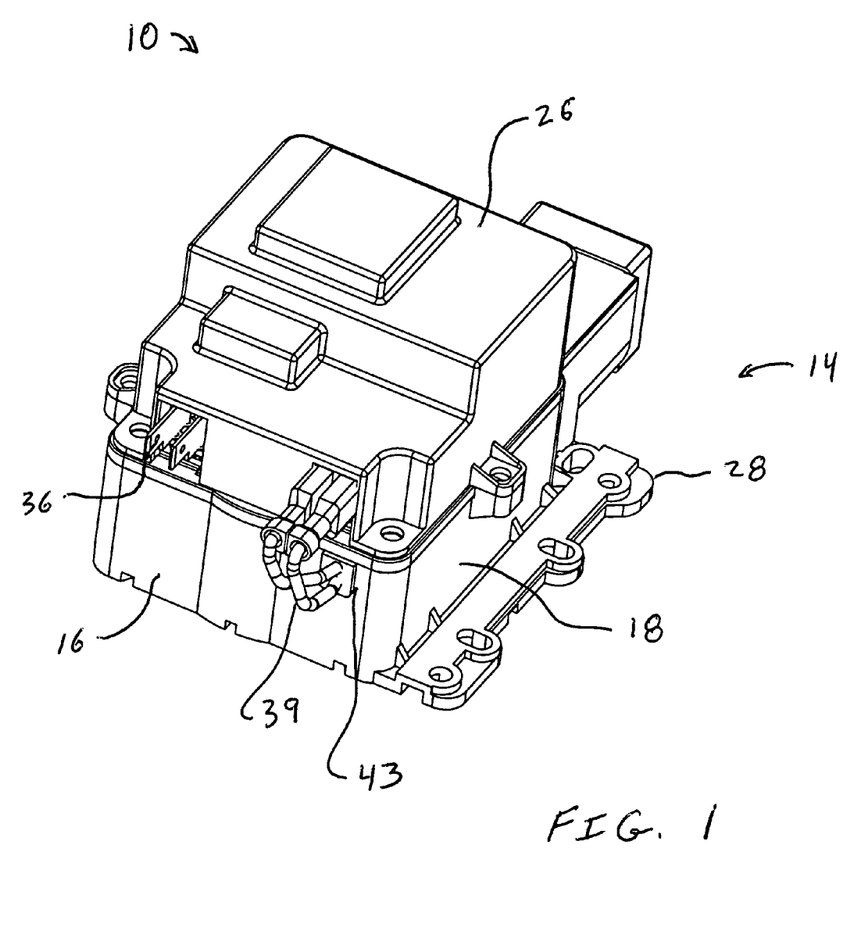
FIG. 1 is an exterior perspective view of a drain valve actuator according to the present invention.
Figure 2:
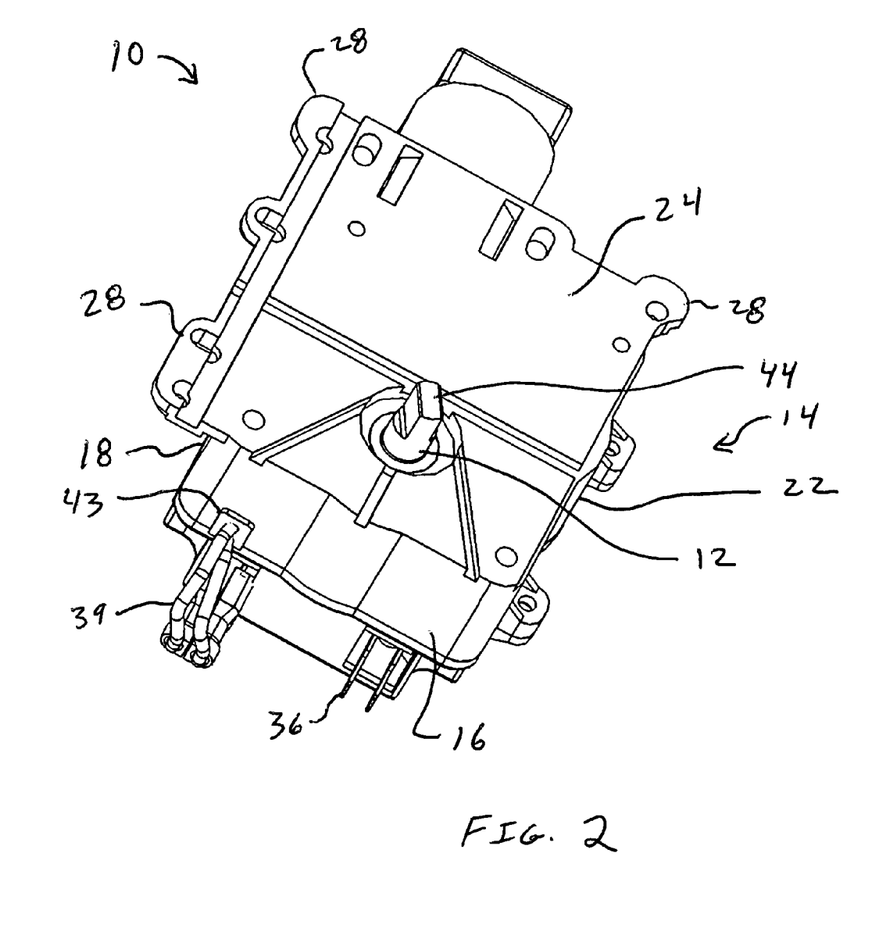
FIG. 2 is another exterior perspective view of the drain valve actuator.
Figure 3:
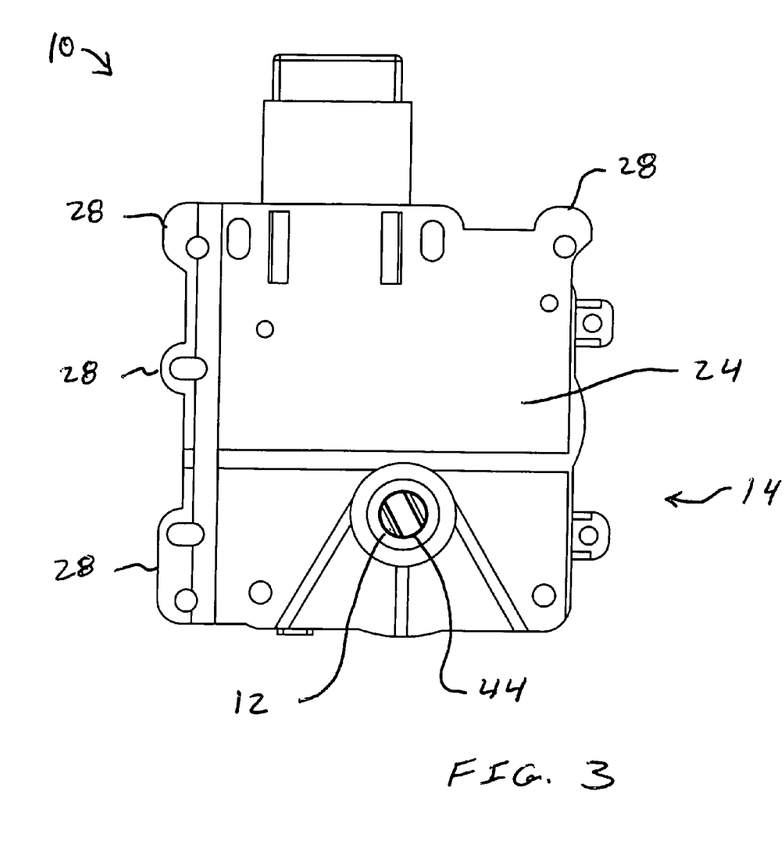
FIG. 3 is an elevational view of the drain valve actuator of FIG. 2.
Figure 4:
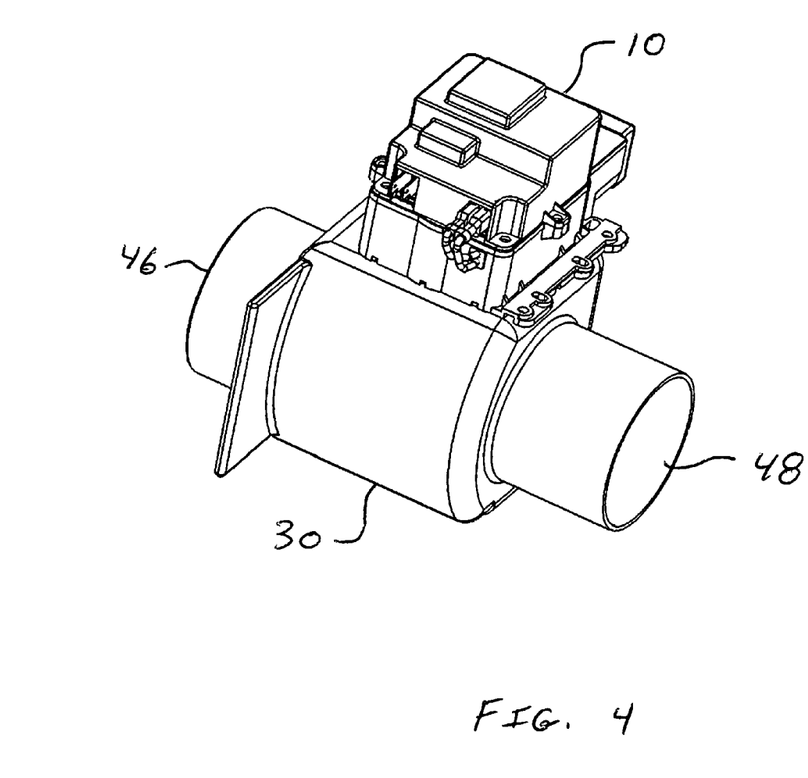
FIG. 4 is a perspective view of the drain valve actuator mounted to a drain valve.
Figure 5:
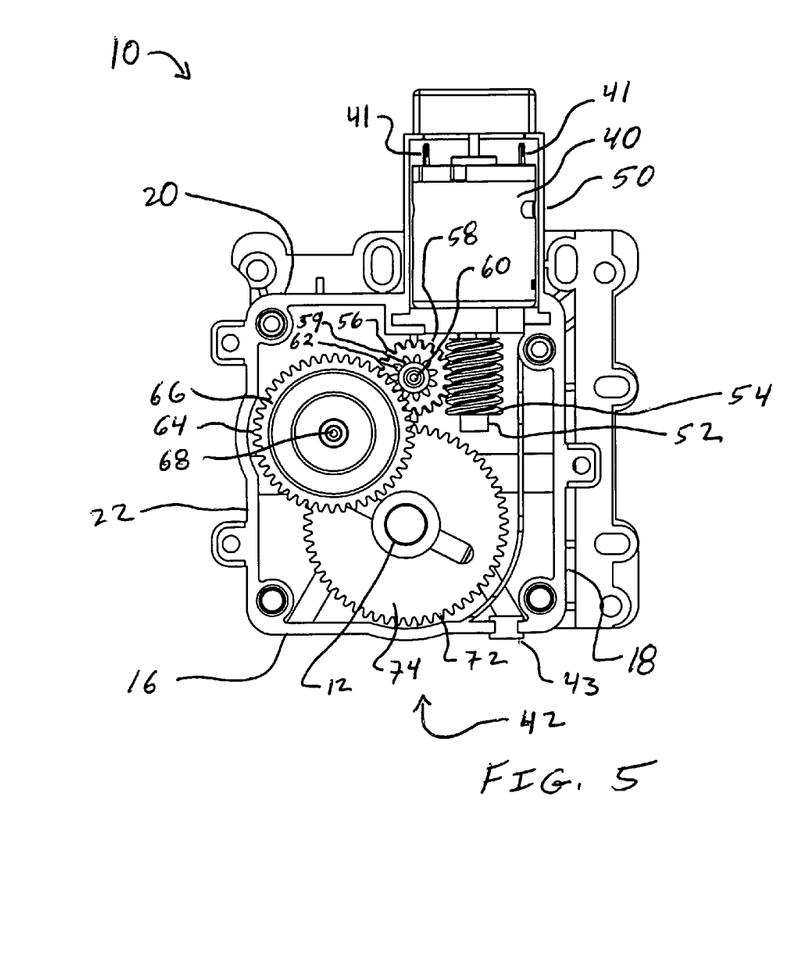
FIG. 5 is an interior view of the drain valve actuator.
Figure 6:
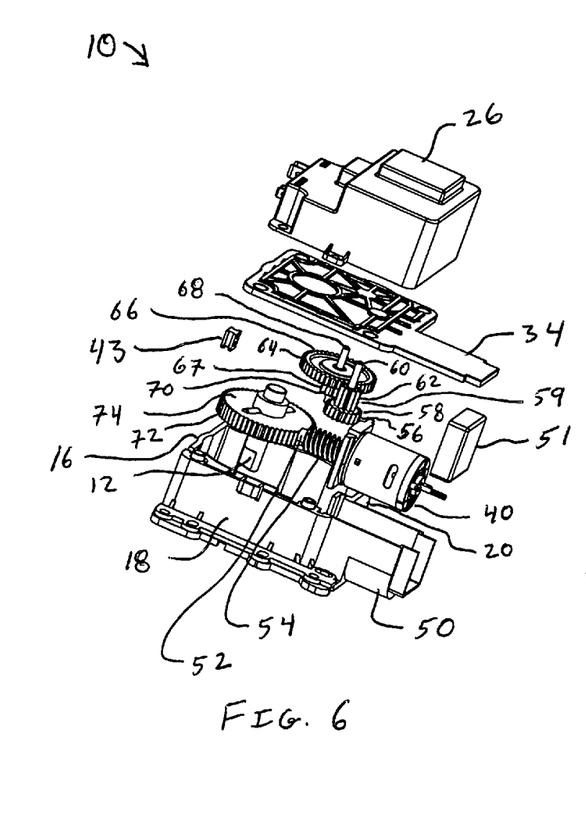
FIG. 6 is an exploded view of the drain valve actuator.

One example of a drain valve actuator 10 according to the present invention is shown in FIGS. 1-7. FIGS. 1 and 2 show exterior perspective views of opposite sides of the drain valve actuator 10 and FIG. 3 shows a plan view of a side of the drain valve actuator 10 having an output shaft 12. The drain valve actuator 10 has a closed housing 14 with side walls 16, 18, 20, 22, 24 (side wall 20 is shown in FIGS. 5 and 6), and a removable cover 26. The drain valve actuator 10 has mounting brackets 28 on its exterior for mounting the drain valve actuator 10, for example to a drain valve 30 (FIG. 4) of an industrial washing machine (not shown). The output shaft 12 extends through the housing 14, such as through the side wall 24, and can be operatively engaged with the drain valve 30.

Figure 7:
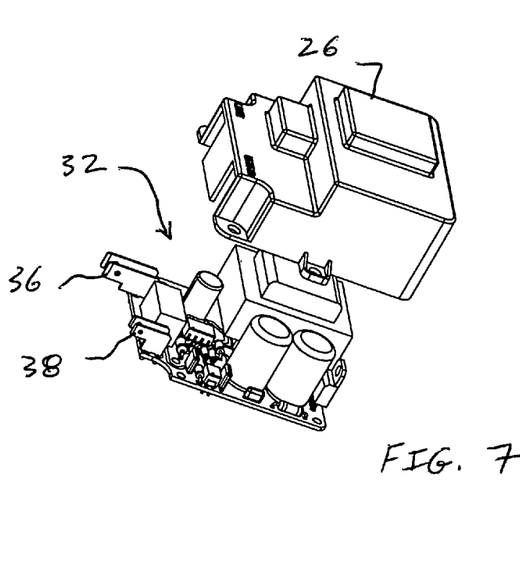
FIG. 7 is a perspective view of a controller and cover of the drain valve actuator.

Referring to FIGS. 1 and 7, the drain valve actuator 10 has a controller 32, for example a printed circuit board, which controls operation of the drain valve actuator 10. The controller 32 is housed within the cover 26. A partition wall 34 (FIG. 6) separates the controller 32 in the cover 26 from the rest of the components in the housing 14. The controller 32 has an electrical connector 36 for connection to a power source. The electrical connector 36 can be connected to an electrical power source which provides power to operate the drain valve actuator 10. An electrical connector 38 (FIG. 7) electrically connects a motor 40 (FIG. 5) to the controller 32. Wires 39 (FIG. 1) are connected to the electrical connector 38 and to terminals 41 (FIG. 5) of the motor 40. The wires 39 can extend through a grommet 43 in the side wall 16 of the housing 14. The wires 39 are omitted from some figures to show other components more clearly. The controller 32 is shown as being mounted within the cover 26. However, the controller 32 can be mounted to other locations as desired, for example to other locations inside or outside the housing 14 or remotely from the housing 14.

The housing 14, the motor 40, a gear train 42 (FIG. 5) and the output shaft 12 can also be referred to as a gear box. The gear box can also optionally include the controller 32.

Referring to FIGS. 2-4, the output shaft 12 of the drain valve actuator 10 is rotatably driven in clockwise and counterclockwise directions by the drain valve actuator 10. The output shaft 12 has a connection portion 44, such as a flattened end, which can be engaged with the drain valve 30, which may be a ball valve, for example. Other output shaft designs or output mechanisms could be used for the output shaft 12, as desired. The drain valve actuator 10 rotates the output shaft 12 to operate the drain valve 30 by providing rotational driving forces to the drain valve 30 and thereby, opening and closing the drain valve 30. Liquid, such as spent wash water, flows through fluid openings 46, 48 of the drain valve 30 when the drain valve actuator 10 places the drain valve 30 in an open position. Similarly, liquid is prevented from flowing through the fluid openings 46, 48 of the drain valve 30 when the drain valve actuator 10 places the drain valve 30 in a closed position. Operation of the drain valve actuator 10 and the drain valve 30 is explained in further detail below.

The components of the drain valve actuator 10 inside of the housing 14 will now be described with reference to FIGS. 5 and 6. FIG. 5 shows a plan view of the inside of the drain valve actuator 10 with the cover 26 removed and FIG. 6 shows a perspective exploded view of the drain valve actuator 10. The drain valve actuator 10 has a motor 40 positioned in a motor holding receptacle 50 of the housing 14. The motor holding receptacle 50 can include a cap 51 and a portion of the partition wall 34 covering the motor 40. The motor 40 can be a direct current (DC) motor which is capable of rotating its motor shaft 52 in both clockwise and counterclockwise directions, such as a permanent magnet DC (PMDC) motor. The motor shaft 52 of the motor 40 is connected to and drives a worm 54. The worm 54 is engaged with a first cluster gear having a worm gear 58 and a spur pinion 59. More specifically, the worm 54 is engaged with teeth 56 of the worm gear 58. The first cluster gear is rotatable about a shaft 60. The first cluster gear (worm gear 58 and spur pinion 59) is engaged with a second cluster gear having a spur gear 66 and a spur pinion 67. Teeth 62 of the spur pinion 59 are engaged with teeth 64 of the spur gear 66. The second cluster gear is rotatable about a shaft 68. Teeth 70 of the spur pinion 67 are engaged with teeth 72 of a spur gear or output gear 74. The output gear 74 is engaged with the output shaft 12 such that the output gear 74 rotates the output shaft 12. The gear train 42 of the drain valve actuator 10 is designed to provide rotational torque to the output shaft 12 to operate the drain valve 30 by opening and closing the drain valve 30.

The controller 32 and operation of the drain valve actuator 10 will now be further explained. The controller 32 is designed to provide operational electrical power to the motor 40 substantially only during opening and closing movements of the drain valve 30. The controller 32 does not provide operational electrical power to the motor 40 when the drain valve 30 is not in motion, such as when the drain valve 30 is in the open or closed positions. Embodiments of the controller 32 may provide a minor amount of electrical power to the motor 40 which is substantially less than a usual amount of power to operate the motor 40 when the drain valve 30 is in the open or closed positions. Such minor amount of electrical power is considered not to be operational electrical power. Also, embodiments of the controller 32 may provide operational electrical power to the motor 40 for a short time period after the drain valve 30 reaches its open or closed positions to ensure the drain valve 30 is in its open or closed position.

The present invention includes numerous embodiments of the controller 32, and a few exemplary embodiments are described herein. The controller 32 has an output signal, such as voltage or current, which is supplied to and drives the motor 40. One feature of the controller 32 is that the controller 32 has a signal reducer which reduces the output signal to the motor 40 when a desired condition has occurred. The desired condition may be, for example, when the drain valve actuator 10, particularly the output shaft 12, is in a particular position. Examples of such conditions include when the output shaft 12 is in positions that correspond to the drain valve 30 being in open and closed positions.

Embodiments of the drain valve actuator 10 can provide advantages. For example, because the controller 32 selectively provides electrical power to the motor 40 only when needed the motor 40 does not run continuously. Also, electricity is conserved.

Figures 8, 9:
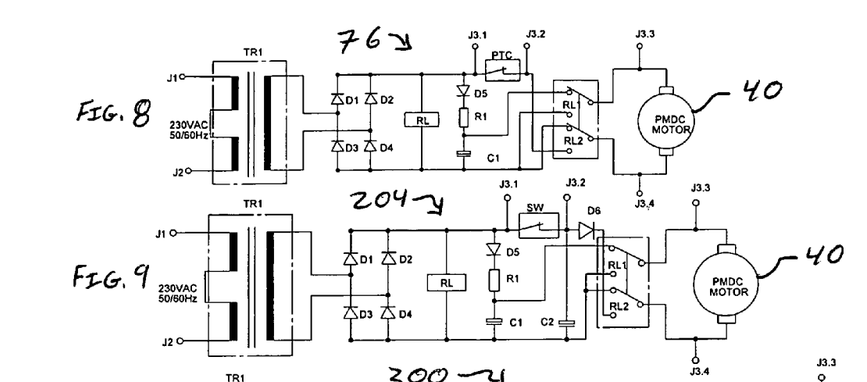
FIG. 8 is a schematic diagram of the controller of the drain valve actuator in which the controller has a positive temperature coefficient thermostat.
FIG. 9 is a schematic diagram of the controller of the drain valve actuator of FIG. 12 in which the controller has a mechanical switch.

Referring to FIG. 8 and also to FIGS. 1-7, an embodiment of the controller 32 of the drain valve actuator 10 is shown schematically as controller 76. The controller 76 is connected to an AC transformer TR1 which is connected to an AC power source J1, J2. The AC power source J1, J2, from an industrial washing machine for example, provides power to the AC transformer TR1. The transformer TR1 reduces the voltage from the power source J1, J2 and provides electrical power to the controller 76. The controller 76 has circuitry which converts the AC current to DC current which is supplied to the motor 40. The controller 76 functions as an electronic switch and has various electrical components, including diodes D, resistors R, relays RL, capacitors C, and connectors J. The controller 76 has a positive temperature coefficient thermostat or power thermal controller PTC which is one particular feature of the controller 76. The positive temperature coefficient thermostat PTC is one example of a signal reducer which reduces the output signal of the controller 76. The controller 76 is, of course, connected to the motor 40 of the drain valve actuator 10.

The positive temperature coefficient thermostat PTC regulates the amount of current passing to the motor 40 depending on the temperature of the positive temperature coefficient thermostat PTC. As the positive temperature coefficient thermostat PTC heats up, the positive temperature coefficient thermostat PTC increases its electrical resistance and reduces the amount of current passing through the circuit of the controller 76. In other words, the current of the output signal of the controller 76 is reduced by the positive temperature coefficient thermostat PTC. In the reverse, as the positive temperature coefficient thermostat PTC cools down, the positive temperature coefficient thermostat PTC reduces its electrical resistance and permits the amount of current passing through the circuit of the controller 76 to increase. The positive temperature coefficient thermostat PTC protects the motor 40 from damage and burn-out. One positive temperature coefficient thermostat PTC suitable for use with the present invention can reduce a DC current of 0.5 amps to about 7 milliamps or about 8 milliamps.

An operation of the drain valve actuator 10 will be described with the drain valve actuator 10 beginning in the drain open position. Power is turned on to the drain valve actuator 10 to operate the drain valve 30 by moving the drain valve 30 to the drain closed position. When power is turned on to the controller 76 the relay RL energizes and assures the correct polarity of the DC voltage supplied to the PMDC motor 40 for a direction of rotation that drives the gear train 42 in a direction which rotates the output shaft 12 in a direction that rotates the drain valve 30 towards the valve closed position. Also, the capacitor C1 charges to the maximum voltage DC value when the power is on.

The DC current passes through the positive temperature coefficient thermostat PTC to the motor 40. The motor 40 rotates the worm 54 which drives the first cluster gear (worm gear 58 and spur pinion 59) which drives the second cluster gear (spur gear 66 and spur pinion 67). The second cluster gear drives the output gear 74 which rotates the output shaft 12, for example about 90°. The output shaft 12 actuates the drain valve 30 and rotates the ball valve, for example about 90°, to the drain closed position. When the drain valve 30 rotates to the drain closed position, the drain valve 30 reaches a stop and cannot rotate any further. When the drain valve 30 reaches the stop, the drain closed position, the motor 40 continues to draw current although the motor shaft 52, the gear train 42 and the output shaft 12 are not in motion. The positive temperature coefficient thermostat PTC heats up due to the current draw and when the positive temperature coefficient thermostat PTC reaches a predetermined temperature, the positive temperature coefficient thermostat PTC reduces the amount of current passing from the controller 76 to the motor 40. The current is reduced by the positive temperature coefficient thermostat PTC at least to an amount that will not damage or significantly damage the motor 40, particularly the motor windings. The drain valve 30 is maintained in the drain closed position by the very high back drive torque of the gear train 42 utilizing the worm 54. In other words, the gear train 42 cannot be easily driven in the reverse direction (valve open direction) because of the worm 54 unless the motor 40 is driven in the valve open direction.

The drain valve 30 is moved from the closed position to the open position when the power to the controller 76 is removed. When the power to the controller 76 is removed (turned off) the relay RL de-energizes and reconnects the motor 40 to the charged capacitor C1. The capacitor C1 discharges and provides current with a reverse polarity (reverse output signal of the controller 76) to the motor 40 that turns the motor shaft 52 in a reverse direction. The reversely driven motor 40 reversely drives the gear train 42 which reversely rotates the output shaft 12. The reversely rotating output shaft 12 rotates the drain valve 30 from the closed position towards the open position. The capacitance value of the capacitor C1 is chosen in a way to allow the motor 40 to drive the drain valve 30 to the drain open position and hit a stop position. The motor 40 drives the gear train 42 and rotates the output shaft 12 in the drain open direction, for example about 90°. The output shaft 12 actuates the drain valve 30 and rotates the ball valve, for example about 90°, to the drain open position. The drain valve actuator 10 is ready for another cycle of closing and opening the drain valve 30.

The drain valve actuator 10 protects the motor 40 from damage and burn-out when the drain valve actuator 10 places and holds the drain valve 30 in the closed position. Also, the drain valve actuator 10 consumes very little electrical energy (a negligible amount, compared to the currently used shaded pole geared motors) during the time the drain valve 30 is held closed.

Figure 12:
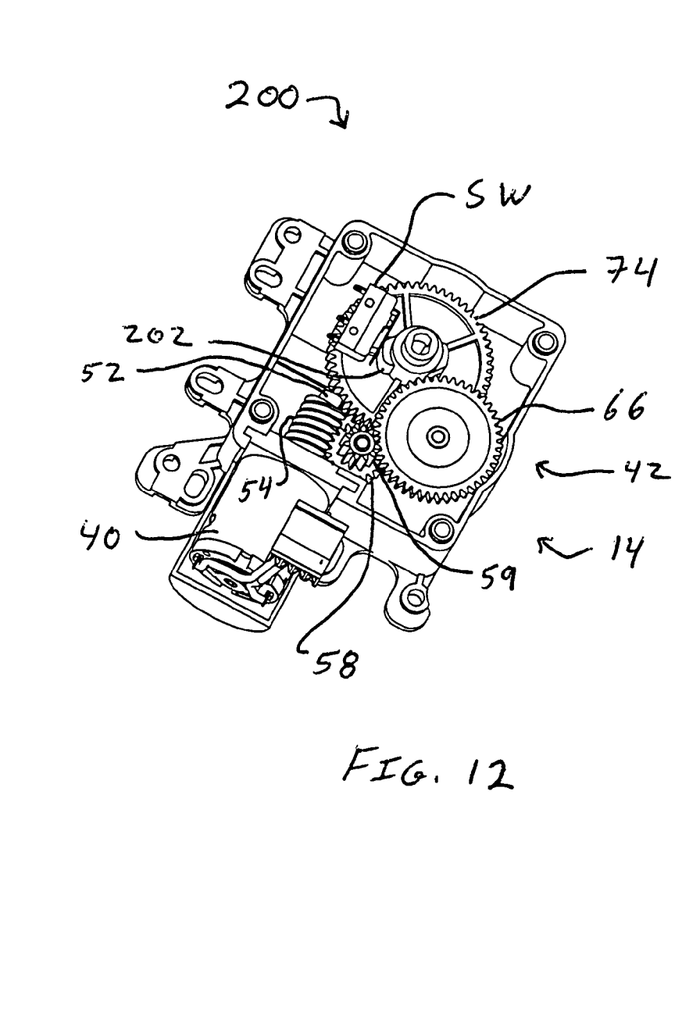
FIG. 12 is an interior perspective view of another embodiment the drain valve actuator in which the controller has a mechanical switch.

Referring to FIGS. 9 and 12, another embodiment of a drain valve actuator 200 is shown. The drain valve actuator 200 is similar to the drain valve actuator 10 of FIGS. 1-7, except a cam 202 is provided on the output gear 74. Also, a switch SW is utilized in the controller 204 instead of the positive temperature coefficient thermostat PTC of the controller 76 of FIG. 8. The switch SW is another example of a signal reducer which reduces the output signal of the controller 204. The cam 202 cooperates with and actuates the switch SW. The switch SW is mounted within the housing 14, although the mounting details are omitted from FIG. 12. The cam 202 is located at an angular position around the rotational centerline of the output gear 74 such that the switch SW is actuated when the output shaft 12 is at particular angular position.

The switch SW protects the motor 40 by cutting off the voltage to the motor 40 when the drain valve 30 is at a particular position. An additional capacitor C2 drives the motor 40 to drive the drain valve 30 to the closed position. The cam 202 and the switch SW are positioned in a way to disconnect the motor 40 from the supply voltage from the controller 204 as the drain valve 30 reaches the closed position. In other words, the voltage of the output signal of the controller 204 is reduced to about 0 volts. The capacitor C1 reversely drives the motor 40 and thus, the drain valve 30 to the open position in the same manner as the embodiment of the controller 76 of FIG. 8.

Figures 10, 11:
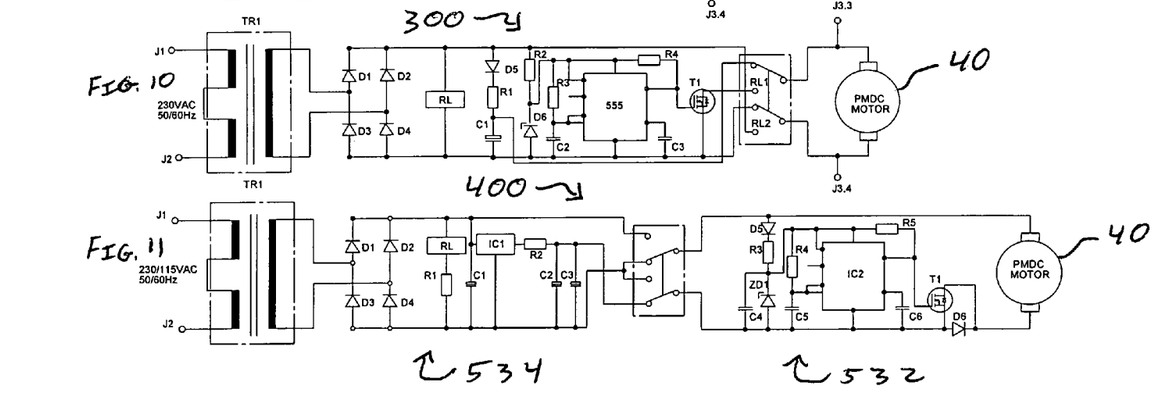
FIG. 10 is a schematic diagram of the controller of the drain valve actuator in which the controller has a timer.
FIG. 11 is a schematic diagram of an alternative embodiment of the controller of FIG. 10.

Another embodiment of a controller 300 of the present invention is shown schematically in FIG. 10. The controller 300 has an electronic timer 555 for turning off the power to the motor 40 after the drain valve 30 is closed instead of the positive temperature coefficient thermostat PTC of FIG. 8 and the switch SW of FIG. 9. The timer 555 is another example of a signal reducer which reduces the output signal of the controller 300. The timer 555 allows voltage to be applied to the motor 40 for only a specified amount of time to close the drain valve 30. Then, the voltage is prevented from being applied to the motor 40 so that the motor windings are protected from damage. In other words, the voltage of the output signal of the controller 300 is reduced to about 0 volts. Additional, capacitors C resistors R, and a MOSFET T1 are utilized with the timer 555. The timer 555 may allow voltage to be applied to the motor 40 for an amount of time that is a little longer than needed to close the drain valve 30 to ensure the drain valve 30 is fully closed. However, this slight amount of additional time will not harm the motor windings. The capacitor C1 reversely drives the motor 40 and thus, the drain valve 30 to the open position in the same manner as the embodiment of the controller 76 of FIG. 8.

FIG. 11 schematically shows another embodiment of a controller 400 similar to the controller 300 of FIG. 10. In FIG. 11, the controller 400 includes an integrated circuit timer IC2 instead of the timer 555 of the controller 300 in FIG. 10. The integrated circuit timer IC2 has a desired time period, for example 2.5 seconds, and then provides a signal to the MOSFET TI to electrically switch. The controller 400 of FIG. 11 operates the motor 40 and the drain valve 30 in the same manner as the controller 300 of FIG. 10.

Figure 13:
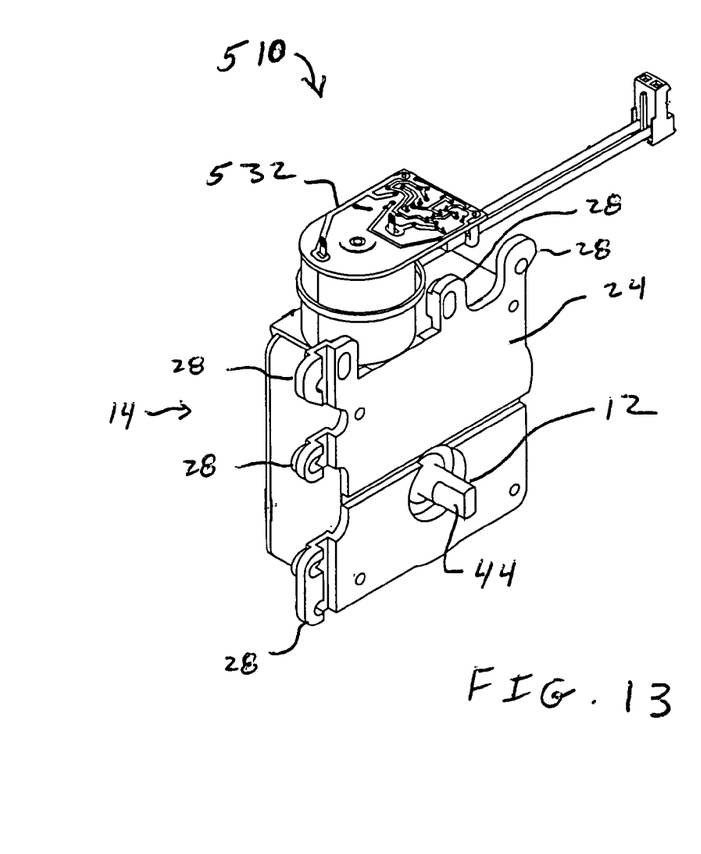
FIG. 13 is a perspective view of another embodiment of the drain valve actuator.

Referring to FIG. 13, another embodiment of the present invention is shown. A drain valve actuator 510 is basically the same as the drain valve actuator 10 of FIGS. 1-7, except for the controller. Instead of the controller 32, the drain valve actuator 510 has a printed circuit board 532 having a timer circuit and which is mounted to the motor 40. For example, the controller 400 of FIG. 11 could be modified and split into two separate printed circuit boards 532, 534 electrically connected together, for example at a relay. The printed circuit board 534 has a control circuit and is mounted at a desired location remotely from the printed circuit board 532 having the timer circuit. Of course, the printed circuit boards 532, 534 can be individually mounted at any desired location on the drain valve actuator or remotely from the drain valve actuator.

Numerous modifications and variations of the present invention are possible in light of the above teachings. The present invention has been described in terms of drain valve actuators for use in industrial washing machines. However, the present invention is broader than that and can be used for other applications. For example, the present invention can be used to operate valves other than drain valves and for applications other than industrial washing machines. Also, embodiments of the present invention can control the valve to be in any desired position, such as a closed position, an open position and partially open/closed positions. Furthermore, different gear trains or force transfer mechanisms can be used to drive the output shaft by the motor. For example, instead of using the worm as the input drive gear from the motor, a bevel gear, a helical gear, a spur gear or any other type of gear or combination of gears could be used. The other gears could also be changed as desired.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:
1. A valve actuator comprising:
a housing;
an electric motor mounted to the housing and having a motor shaft;
a rotatable output shaft extending through a wall of the housing;
a gear train within the housing and operatively connected to the motor shaft and to the output shaft; and
a controller for providing selective electrical operational power to the motor only when needed, the controller comprising:
an output signal which drives the motor which drives the gear train which rotates the output shaft from a first position to a second position,
a reverse output signal having a reverse polarity which reversely drives the motor which reversely drives the gear train which reversely rotates the output shaft from the second position to the first position,
positive temperature coefficient thermostat which reduces without stopping the output signal to the motor when the output shaft is in the second position.
2. The valve actuator according to claim 1, wherein the positive temperature coefficient thermostat reduces a current of the output signal.
3. The valve actuator according to claim 1, wherein the controller further comprises a printed circuit board mounted to the motor.
4. The valve actuator according to claim 1, wherein the gear train comprises:
a worm mounted on the motor shaft;
a first cluster gear having first teeth engaged with the worm, and having second teeth;
a second cluster gear having first teeth engaged with the first teeth of the first cluster gear, and having second teeth; and
an output gear engaged with the second teeth of the second cluster gear, the output gear engaged with the output shaft such that rotation of the output gear rotates the output shaft.

* * * * *